United States Patent
Cichonski

(10) Patent No.: US 10,893,263 B2
(45) Date of Patent: Jan. 12, 2021

(54) METHOD AND SYSTEM FOR PARING SHUTTER GLASSES WITH A REMOTE CONTROL UNIT

(71) Applicant: ADVANCED DIGITAL BROADCAST S.A., Eysins (CH)

(72) Inventor: Dariusz Cichonski, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 0 days.

(21) Appl. No.: 15/687,485

(22) Filed: Aug. 27, 2017

(65) Prior Publication Data
US 2018/0063522 A1   Mar. 1, 2018

(30) Foreign Application Priority Data

Aug. 30, 2016 (EP) ..................... 16186451

(51) Int. Cl.
| | | |
|---|---|---|
| H04N 13/398 | (2018.01) | |
| H04N 13/332 | (2018.01) | |
| H04N 13/296 | (2018.01) | |
| H04N 13/341 | (2018.01) | |
| G09G 5/00 | (2006.01) | |
| H04N 13/30 | (2018.01) | |

(52) U.S. Cl.
CPC .......... *H04N 13/398* (2018.05); *G09G 5/003* (2013.01); *H04N 13/296* (2018.05); *H04N 13/332* (2018.05); *H04N 13/341* (2018.05); *H04N 2013/403* (2018.05); *H04N 2013/405* (2018.05); *H04N 2213/008* (2013.01)

(58) Field of Classification Search
CPC .......... H04N 13/0497; H04N 13/0296; H04N 13/0429; H04N 2213/008; G09G 5/003
USPC ........................................... 348/522
See application file for complete search history.

(56) References Cited

U.S. PATENT DOCUMENTS

| 8,665,291 B2 * | 3/2014 | Zalewski ............. H04N 13/334 |
| | | 345/590 |
| 2011/0310235 A1 * | 12/2011 | Sasaki .................. H04N 13/189 |
| | | 348/54 |

(Continued)

FOREIGN PATENT DOCUMENTS

| EP | 2385706 | 11/2011 |
| WO | 2012018669 | 2/2012 |

*Primary Examiner* — Jefferey F Harold
*Assistant Examiner* — Omer Khalid
(74) *Attorney, Agent, or Firm* — Mark M. Friedman

(57) ABSTRACT

A method for pairing of shutter glasses (411-414) with a remote control unit (RCU) (461-464, 272-273) for use with a display device (220, 230) configured to display a plurality of video streams by time interleaving the frames of the video streams and sending synchronization signal to shutter glasses. The method comprises the steps of: generating at least one synchronization signal (911, 912; 921, 922; 913, 923) for the shutter glasses (411-414); receiving an IR signal (331B) from the RCU (461-464, 272-273); comparing the temporal correspondence of the received IR signal (331B) with the generated at least one synchronization signal (911, 912; 921, 922; 913, 923); and in case a temporal correspondence is found, pairing the RCU (461-464, 272-273) with the shutter glasses (411-414) for which the correspondent synchronization signal (911, 912; 921, 922; 913, 923) was found.

3 Claims, 18 Drawing Sheets

(56) References Cited

U.S. PATENT DOCUMENTS

| | | | |
|---|---|---|---|
| 2012/0057005 A1* | 3/2012 | Shibahara | H04N 13/144 348/56 |
| 2012/0081527 A1* | 4/2012 | Richardson | H04N 13/341 348/56 |
| 2012/0098830 A1* | 4/2012 | Kim | H04N 13/341 345/419 |
| 2012/0190439 A1* | 7/2012 | Nourbakhsh | G02B 30/25 463/31 |
| 2013/0027526 A1* | 1/2013 | Mao | G02B 30/24 348/56 |
| 2013/0169672 A1* | 7/2013 | Kim | G09G 5/003 345/619 |
| 2013/0235170 A1* | 9/2013 | Huang | G02B 30/24 348/55 |

* cited by examiner

METHOD AND SYSTEM FOR PARING SHUTTER GLASSES WITH A REMOTE CONTROL UNIT

TECHNICAL FIELD

The present invention relates to a method for pairing shutter glasses with a remote control unit (RCU).

BACKGROUND

Currently available video display technologies allow full-screen display of a plurality of video streams on a single TV display, monitor or even a cinema screen, to allow the plurality of users to watch different streams simultaneously.

For example, this can be achieved by time-interleaving the successive frames of the video streams. First, a first frame of stream "A" can be displayed, then a first frame of stream "B", then a first frame of stream "C", and next a second frame of stream "A", a second frame of stream "B" and so on. So-called shutter glasses can be used by individual users (watchers) to watch particular video streams, as known from the 3D video technology. The shutter glasses have lenses which change from transparent to opaque and vice versa. The process of changing the state of the lenses is controlled electronically and is relatively fast comparing to human perception. The glasses are synchronized with the display such that when the frames of the stream "A" are displayed, the shutter glasses "1" are transparent and the other glasses are opaque, and when the frames of the stream "B" are displayed, the shutter glasses "2" are transparent and the other glasses are opaque, and so on. If the video streams are monoscopic, both lenses for the left and right eye change their state simultaneously. As a result, the watcher wearing the glasses "1" observes only frames related to stream "A" while the watcher wearing the glasses "2" observes only the frames of stream "B" and so on. Therefore, the video streams can be selected independently by different watchers for simultaneous watching on the same display.

The aforementioned method may be also applied for simultaneous watching of 3D video streams, as well as simultaneous watching of 3D and 2D video streams. The technology is limited mainly by the maximum amount of frames that can be displayed per a unit of time by the displaying device.

The video streams may be provided from one source or a plurality of different sources, such as a computer, a game console, a television set-top box, a DVD player, a smartphone etc. For example, a game console may provide two distinct video streams, each for a different player. Alternatively, a single display can be used by two watchers, wherein one watcher intends to watch a video stream from a game console and the second watcher intends to watch a television program from a set-top box.

Each watcher should have an individual headset to receive a sound track corresponding to the watched video stream. In another scenario of use, different watchers can watch the same video stream, but with different sound tracks (for example different languages).

There is a need to provide, for each watcher of the multi-stream display, a way to control the display of the stream watched by the watcher, for example by providing a menu that is at least partially independent for each watcher, such that each watcher may individually control the display.

To browse and operate the multi instantiations menu, for convenience, two or more RCUs are recommended, one for each watcher. Therefore, each watcher has an associated RCU. This requires to synchronize each RCU with the shutter glasses such that the device driving the display can associate the RCU with a particular watcher.

There are known various methods for pairing (synchronization) of devices with each other. Typically, a bidirectional radio communication and dedicated pushbuttons are needed for initialization of the synchronization. For example, Wi-Fi devices use WPS (Wi-Fi Protected Setup) synchronization. It is also possible to permanently associate two devices with each other, for example the shutter glasses can be permanently paired with a particular RCU. However, such permanent pairing is inconvenient and in case one of the devices is damaged, the other device becomes useless.

Therefore there is a need to provide an alternative method for pairing watchers' devices, which would allow to synchronize simple devices not equipped with bidirectional communication.

SUMMARY

There is disclosed a method for pairing of shutter glasses with a remote control unit for use with a display device configured to display a plurality of video streams by time interleaving the frames of the video streams and sending synchronization signal to shutter glasses, wherein the method comprises the steps of: generating at least one synchronization signal for the shutter glasses; receiving an IR signal from the RCU; comparing the temporal correspondence of the received IR signal with the generated at least one synchronization signal; and in case a temporal correspondence is found, pairing the RCU with the shutter glasses for which the correspondent synchronization signal was found.

The IR signal can be found to be corresponding with a particular synchronization signal when the IR signal is at least partially active during the active time of the synchronization signal and when the IR signal is not active during the inactive time of the synchronization signal.

The method may comprise receiving an identifier ID of the RCU before generating the at least one synchronization signal.

The method may further comprise generating a synchronization message on the display before generating the at least one synchronization signal.

The method may comprise generating the synchronization message at frames of all displayed video streams.

The synchronization message may comprise an instruction for the user to place the shutter glasses between the IR transmitter of the RCU and the IR receiver of the display device.

The RCU can be configured to transmit a series of impulses upon pressing a dedicated synchronization button.

There is also disclosed a non-transitory computer readable storage medium comprising instructions that, when executed by a computer, enable method for pairing of shutter glasses with a remote control unit in accordance with the method as described above.

There is also disclosed a display device configured to display a plurality of video streams by time interleaving the frames of the video streams and sending synchronization signal to shutter glasses, the display device being controllable by at least one remote control unit, wherein the display device comprises a controller configured to pair shutter glasses with a remote control unit by: generating at least one synchronization signal for the shutter glasses; receiving an IR signal from the RCU; comparing the temporal correspondence of the received IR signal with the generated at least one synchronization signal; and in case a temporal correspondence is found, pairing the RCU with the shutter glasses for which the correspondent synchronization signal was found.

BRIEF DESCRIPTION OF DRAWINGS

Further details and features of the present invention, its nature and various advantages will become more apparent from the following detailed description of the preferred embodiments shown in drawings, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DETAILED DESCRIPTION

Figure 1:
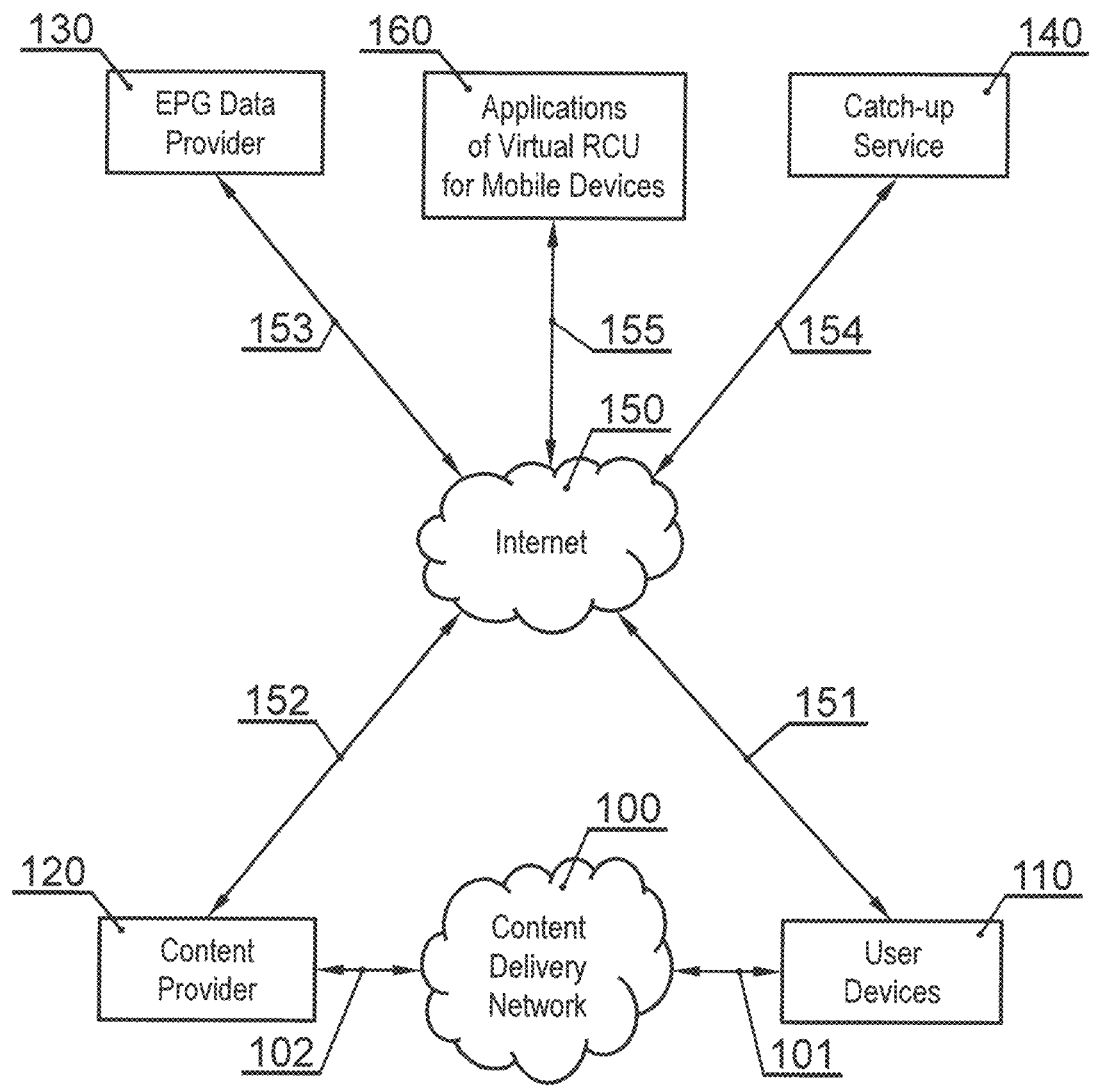
FIG. 1 shows an overview of a content distribution system.

FIG. 1 presents an overview of a content distribution system. Content can be provided to user devices 110 by various distributors from various sources. A content provider 120 may provide linear TV content, such as time-and-channel based television, live broadcasts etc., to a content delivery network 100, which may be broadcast, multicast or unicast. The user is connected with the content delivery network via a transmission channel 101, such as a Cable, Satellite, Terrestrial, IP multicast network or other type of network. Additional services are available to the user devices 110 linked via a transmission channel 151 with the internet 150 (or through the content provider 120 connected via a transmission channel 152 with the Internet and via a transmission channel 102 with the content delivery network 110) and include at least some of the following.

A catch-up service 140 is configured to provide, via a transmission channel 154, retransmission the content that has been already broadcast as linear TV, in order to allow the users to watch it a few hours or even days later.

An Electronic Program Guide (EPG) data provider 130 is configured to provide, via a transmission channel 153, additional data about content available from various sources, including the content available from the content delivery network 100 and the other content providers 140.

The content items for which the program guide is displayed may include live broadcast events and/or other content items, such as catch-up content, video-on-demand content, etc.

The transmission channels 151-154 may be of any known type, such as wired or wireless, using transmission technologies suitable to carry data of a particular service.

An application server 160 is configured to provide, via a transmission channel 155, applications of virtual RCU for mobile devices allowing them to emulate a regular RCU unit.

Figure 2:
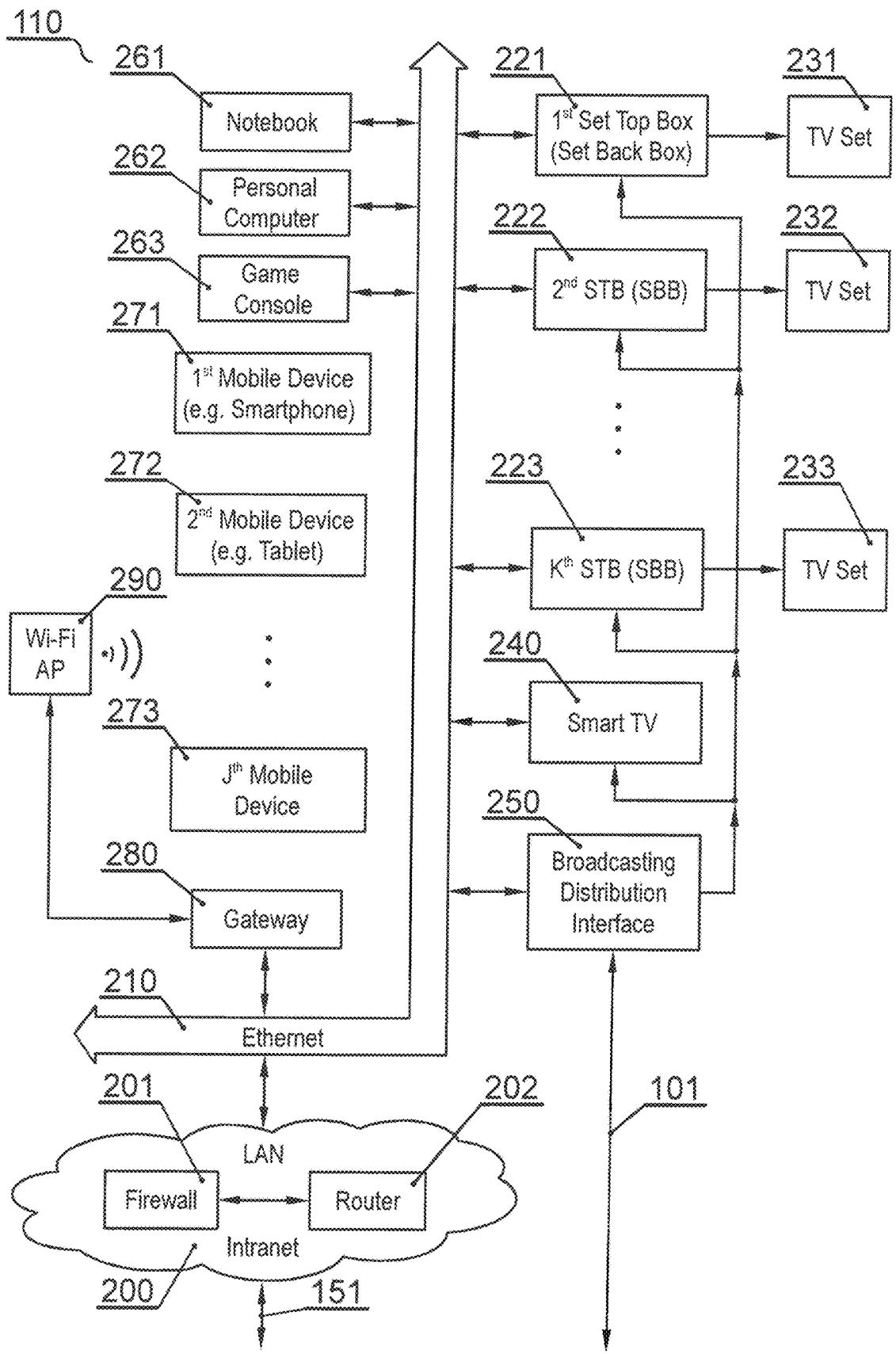
FIG. 2 shows an overview of the content distribution system at user premises.

FIG. 2 presents an overview of a content distribution system at a user premises, such as at home or at an office. The user devices are connected to an Intranet—a local area network (LAN) 200 via an interface such as Ethernet (IP) 210, which is connected with the Internet 150 via the transmission channel 151. The LAN 200 preferably includes a firewall 201 and a router 202 configured to secure and coordinate data transmission. A gateway 280 may provide access to the Intranet 200 via a wireless access point (AP) 290, such as in Wi-Fi technology. A plurality of devices may be used in the user premises. Some of the devices may be mobile devices, such as a smartphone 271, a tablet 272 or another type of device 273. Other devices may be mobile or stationary and include devices such as a notebook computer 261, a personal computer 262, a game console 263, a Set Top Box (STB) or a Set Back Box (SBB) 221, 222, 223 connected to a television set 231, 232, 233, or a smart television set 240. A broadcasting distribution interface 250 may receive content from the content delivery network 100 via the transmission channel 101 and/or from the other devices 221-223, 240, 261-263, 271-273, 280 via direct links or the Ethernet interface 210 and distribute it to the other devices via direct links or via the Ethernet interface 210.

Figure 3A:
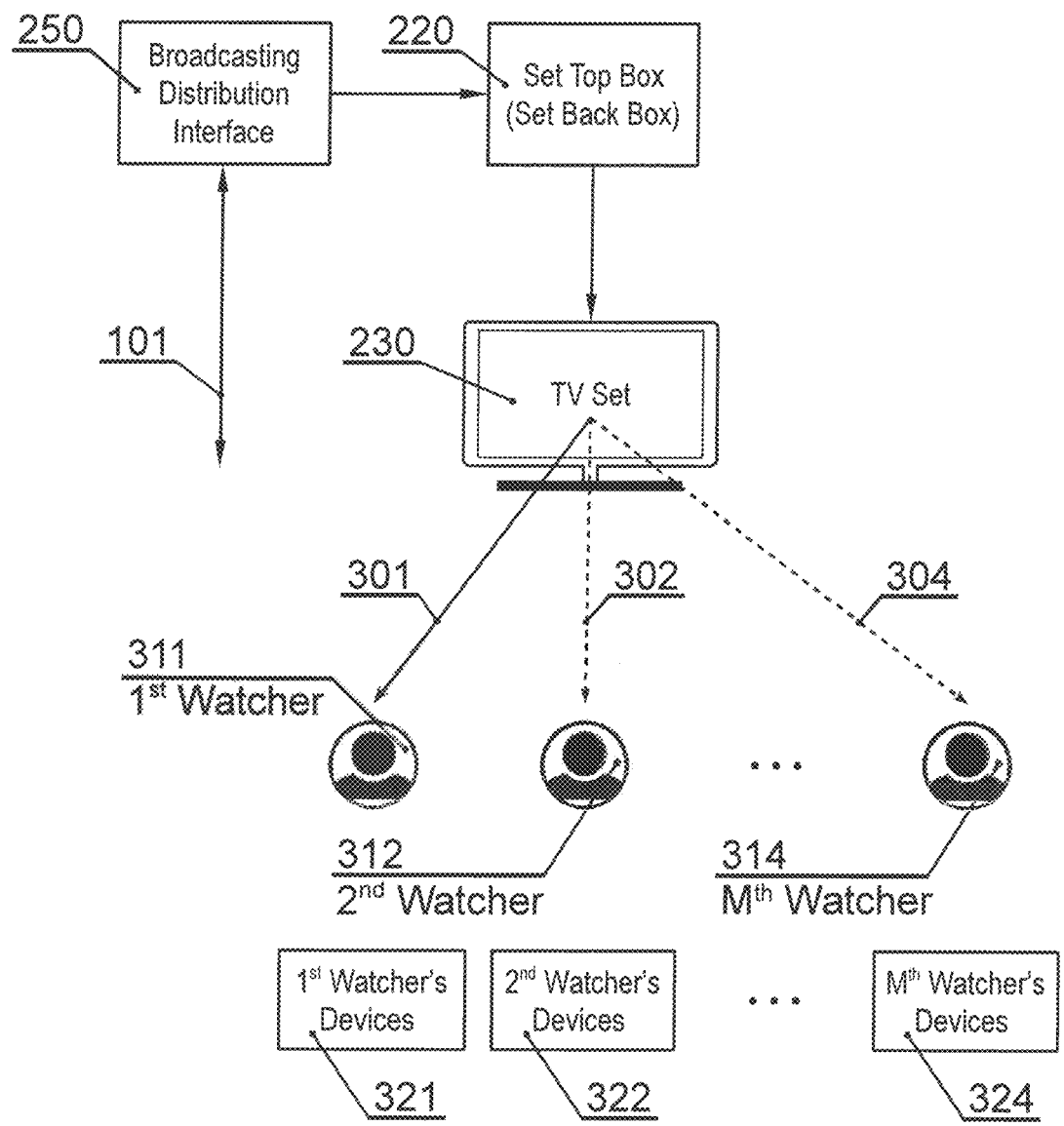
FIGS. 3A-3C show different embodiments of the system of FIG. 2.

FIG. 3A shows one example of an embodiment of the system of FIG. 2. A video decoder device 220 (such as a Set Top Box or a Set Back Box) receives data from the broadcasting distribution interface 250, decodes it and displays on a display device 230 (such as a TV set). The decoder 220 is configured to output a plurality of video streams such that they can be watched simultaneously by the watchers, as known in the art and e.g. explained in the background section. The decoder 220 is configured to provide a menu with multiple instantiations, as will be explained in details below. The menu has a graphical user interface (GUI) with several simultaneous instantiations associated with each watcher 311-314 associated to corresponding shutter glasses. Each watcher may be associated with several devices 321-324: glasses (with or without headphones), a Remote Control Unit (RCU) (regular or emulated by software application run on a mobile device) and headphones (autonomic wired or wireless, or wired connected to the mobile device). Separate instantiation of the multi-user GUI is operated for each watcher 311-314, therefore the watchers may navigate through different modules of the menu at the same time while watching the same Display device. The shutter glasses are synchronized so that when contents 301 for the watcher 311 are displayed, then that glasses 411 (shown in FIG. 7A) are transparent while the glasses of other watchers 312-314 are opaque. The same applies in equivalent manner to contents 302-304 for the other watchers 312-314.

Figure 3B:
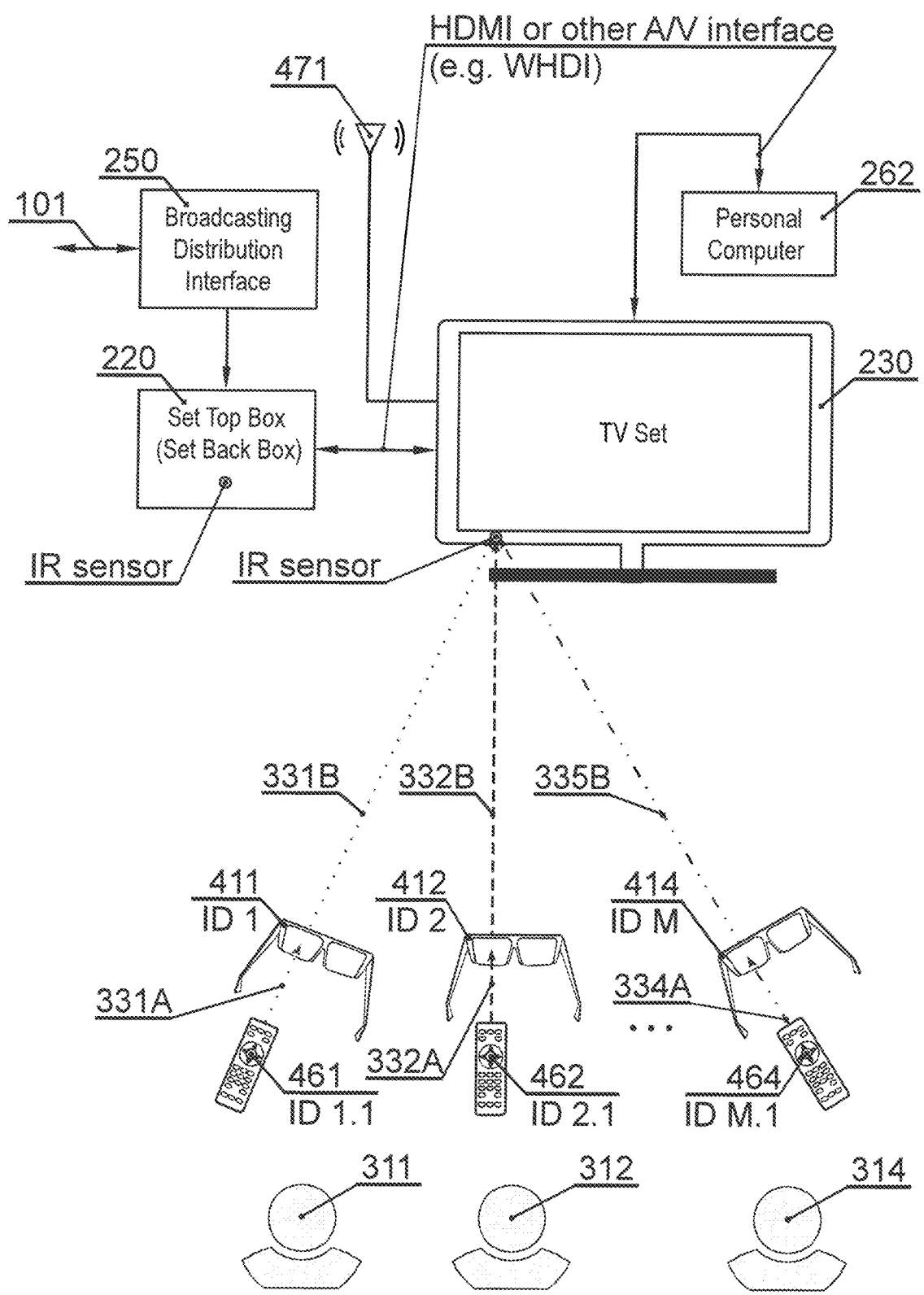

FIG. 3B shows another embodiment, in a configuration wherein the TV set 230 is connected with the decoder 220 by means of a HDMI interface or another A/V interface (e.g. WHDI—Wireless Home Digital Interface) and is further connected with another video source like e.g. a personal computer 262 and with a terrestrial antenna 471. In such a case, the TV set 230 must have an integrated function for combining the video streams received from different sources and displaying the streams in a sequential manner. The TV set 230 and the decoder 220 have an IR sensor. Each watcher 311, 312, 314 utilizes their shutter glasses 411, 412, 414 and a remote control unit 461, 462, 464. The shutter glasses have their own identification number—the glasses 411 have the identification number ID1, the glasses 412 have ID2 and so on. Similarly, the RCUs also have their own identification number for example the first RCU 461 has an ID 1.1, the second RCU 462 has an ID 2.1 and the last RCU 464 has an ID M.1 wherein M is the consecutive number of the watcher. The identification number is transferred to the receiving device while sending any command from the RCU (i.e. after any button is pressed). Additionally, the RCU may be equipped with a synchronization button, to facilitate the pairing process. The synchronization (pairing) procedure of the remote control units with the shutter glasses is conducted in the TV set by transferring the IR signal 331A, 332A, 334A of the RCU through the lens of the appropriate shutter glasses 411, 412, 414 (the one to be synchronized with the given RCU). The signals passed through the particular glasses are received by the TV set which recognizes and associates the signals 331B, 332B, 334B with the corresponding synchronization times of the particular shutter glasses. In other words, the TV set receives only parts of the signals emitted by the RCU which passed through the lens of the shutter glasses during their transparent state, and based on this the TV set is able to determine which signal passed through the given glasses.

Figure 3C:
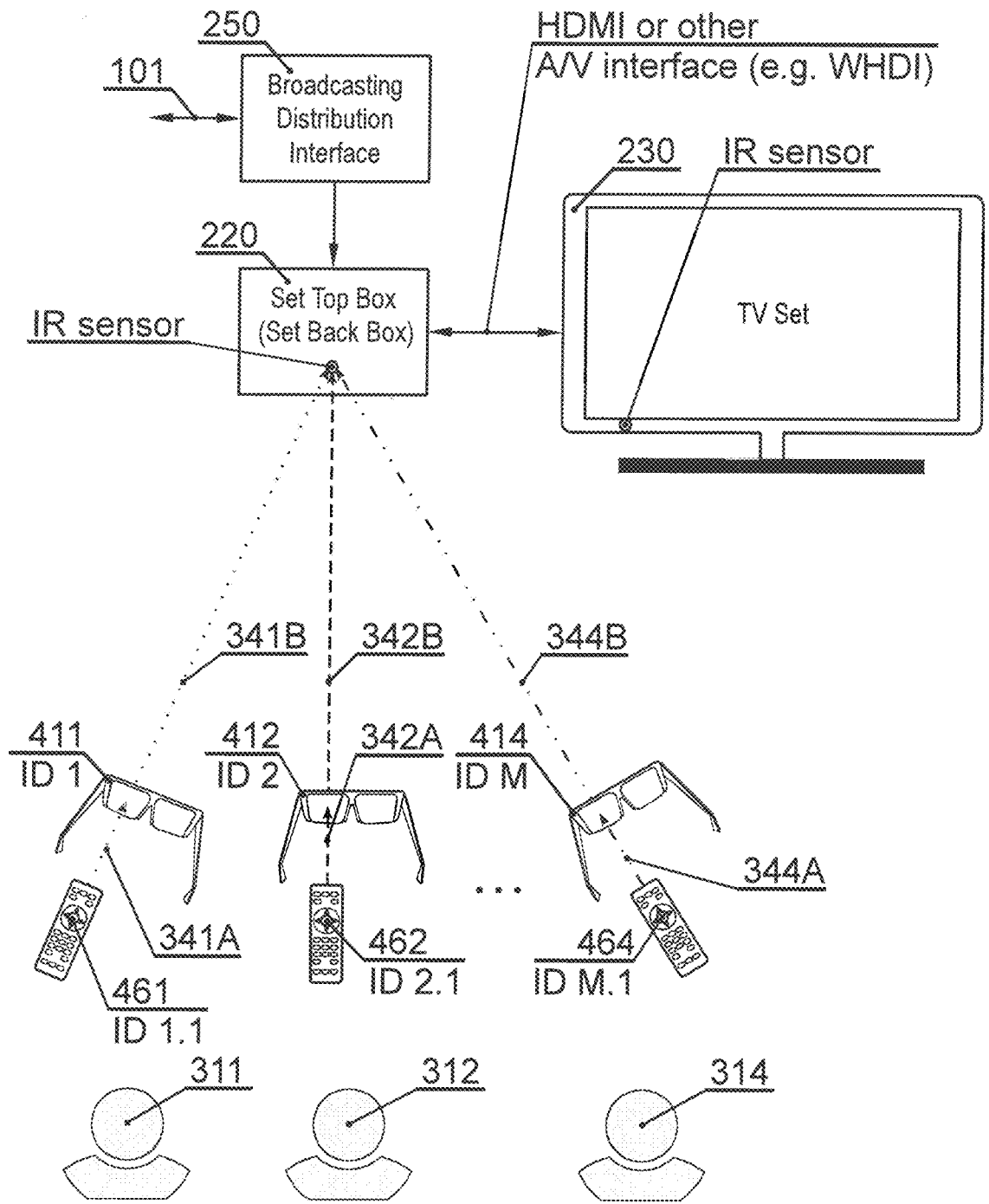

FIG. 3C shows a configuration where the synchronization procedure of the remote control units with the shutter glasses is conducted in the decoder 220 by means of a method equivalent to that described above with reference to FIG. 3B. In this configuration of the system, the TV set 230 may be a standard TV, which simplifies the overall system design, as well as its costs. The frame sequence which is to be displayed on the TV set is prepared by the decoder 220.

Figure 4A:
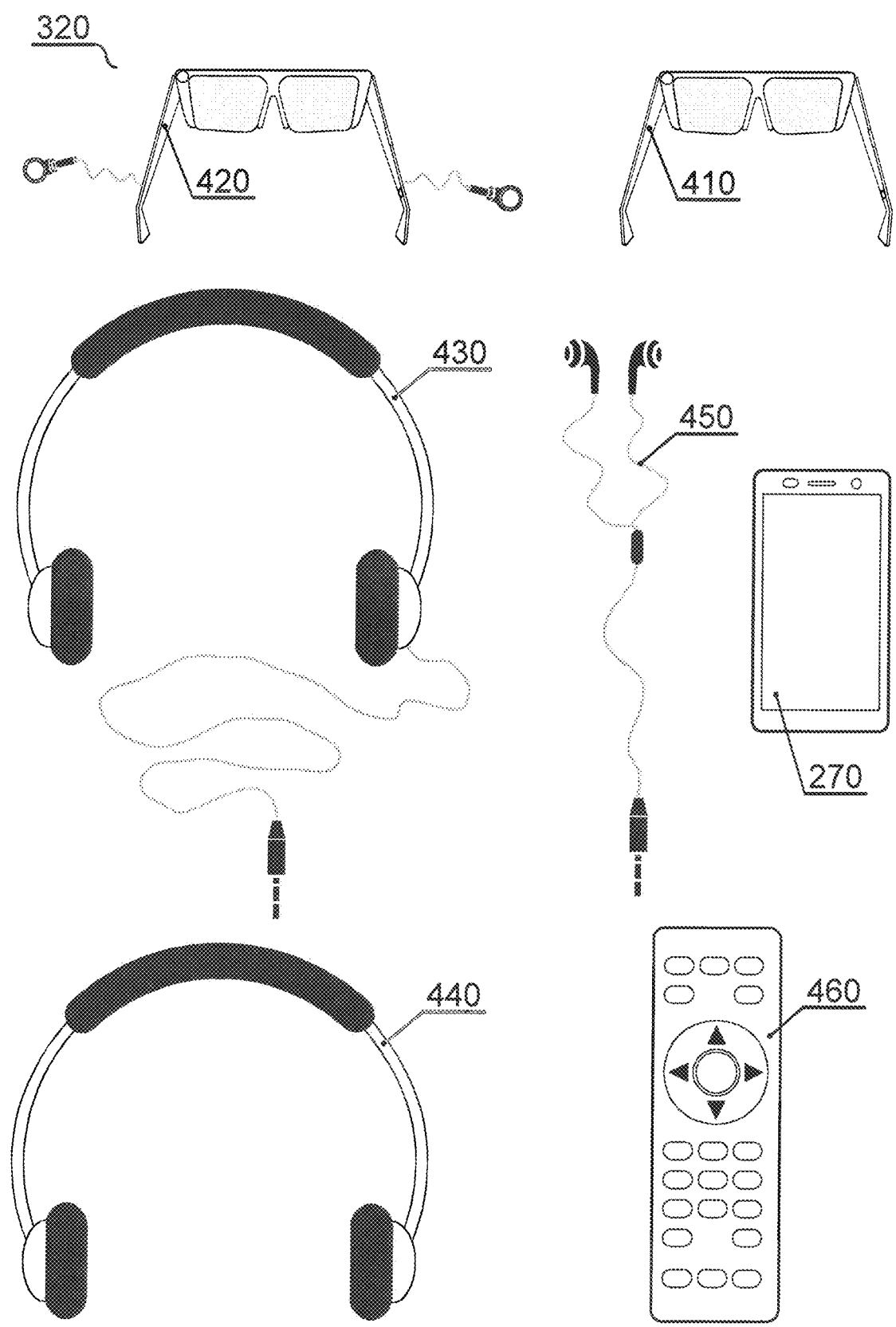
FIG. 4A shows examples of user devices.

FIG. 4A shows examples of user devices. The watcher may use different user devices for controlling the GUI menu and receiving the audio/video streams. For example, a standard RCU 460, a mobile device 270, shutter glasses with earphones 420 or shutter glasses without earphones 410, wired or wireless headphones 430, 440, 450 can be used.

Figure 4B:
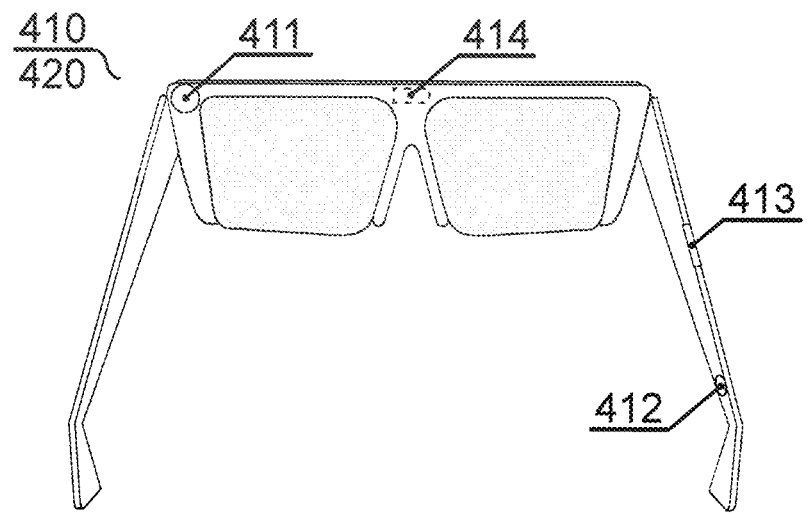
FIG. 4B shows details of user glasses.

FIG. 4B shows a detailed example of shutter glasses 410, 420. The shutter glasses 410, 420 can be equipped with a mechanical micro switch or a touch sensor 413 for activating and deactivating the glasses, an IR transmitter 412 and an IR receiver 411 for on-head detection (i.e. detecting whether the user wears the glasses) and a communication system 414 for bidirectional communication with the decoder or the display device. The head of the user is detected when the signal path between the IR transmitter 412 and the IR receiver 411 is obstructed. After taking off the glasses, the IR receiver 411 receives a signal from the IR transmitter 412 and the glasses can be automatically deactivated. The bidirectional communication system 414 receives synchronization signals, which control the state of the lenses (transparent or opaque).

Figure 5A:
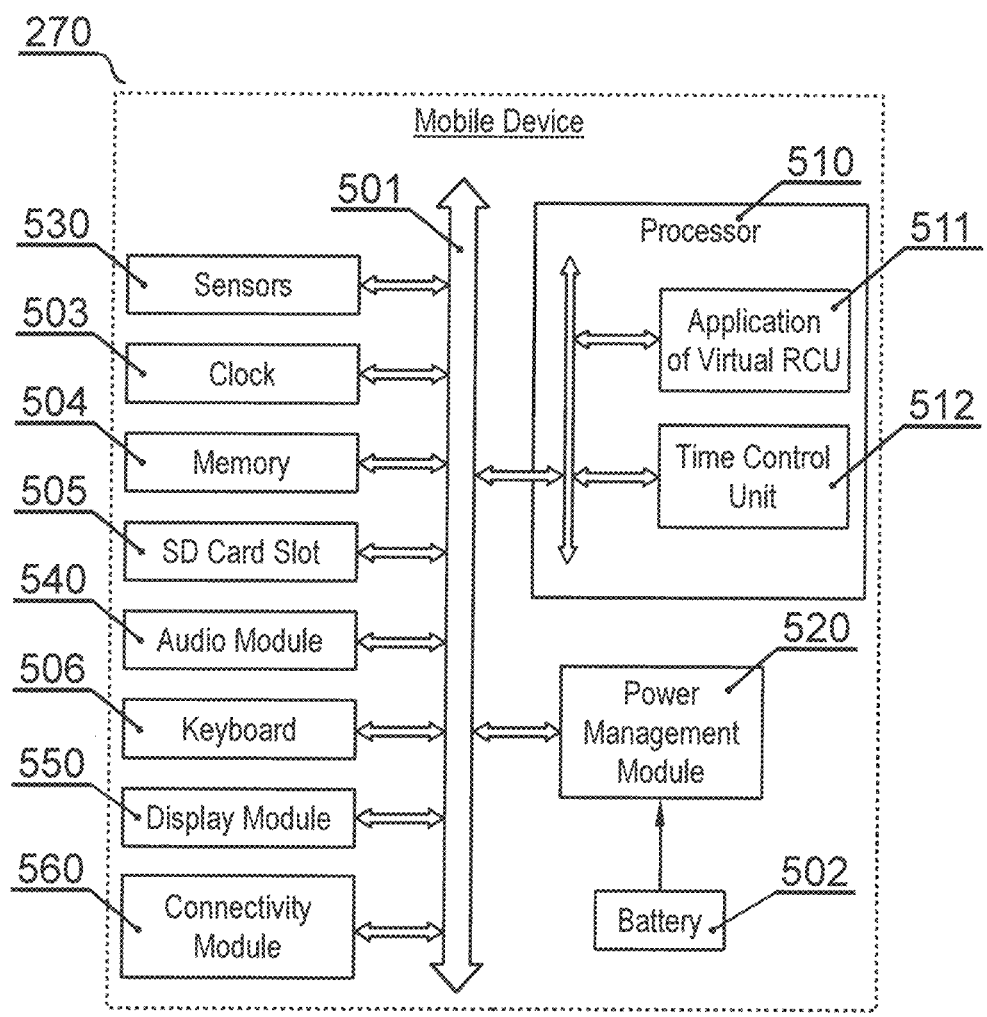
FIG. 5A shows a typical setup of a mobile device.

FIG. 5A presents a typical setup of a mobile device 270. The device 270 comprises a connectivity module 560 responsible for wirelessly receiving and/or transmitting data. A memory 504 is used for storing data (including data associated with the cooperating user devices) as well as software executed by the processor 510 of the mobile device (for example, the virtual RCU 511 application). A clock module 503 is configured to provide clock reference for other modules of the system (cooperating with a time control module 512 of the processor). A sensors module 530 comprises at least one sensor as will be presented with reference to FIG. 5B.

Other, typical, but optional modules of the mobile device are a display module 550 configured to display the GUI to a user, a keyboard 506 operating as an input interface for the mobile device, an audio module 540 configured to generate audible signals and/or an external memory slot such as an SD card slot 505 configured to receive and operate an external memory unit.

A bidirectional data bus 501 may be employed to enable communication between the modules and the processor 510.

The mobile device may also comprise a power management module 520 cooperating with a battery 502.

Figure 5B:
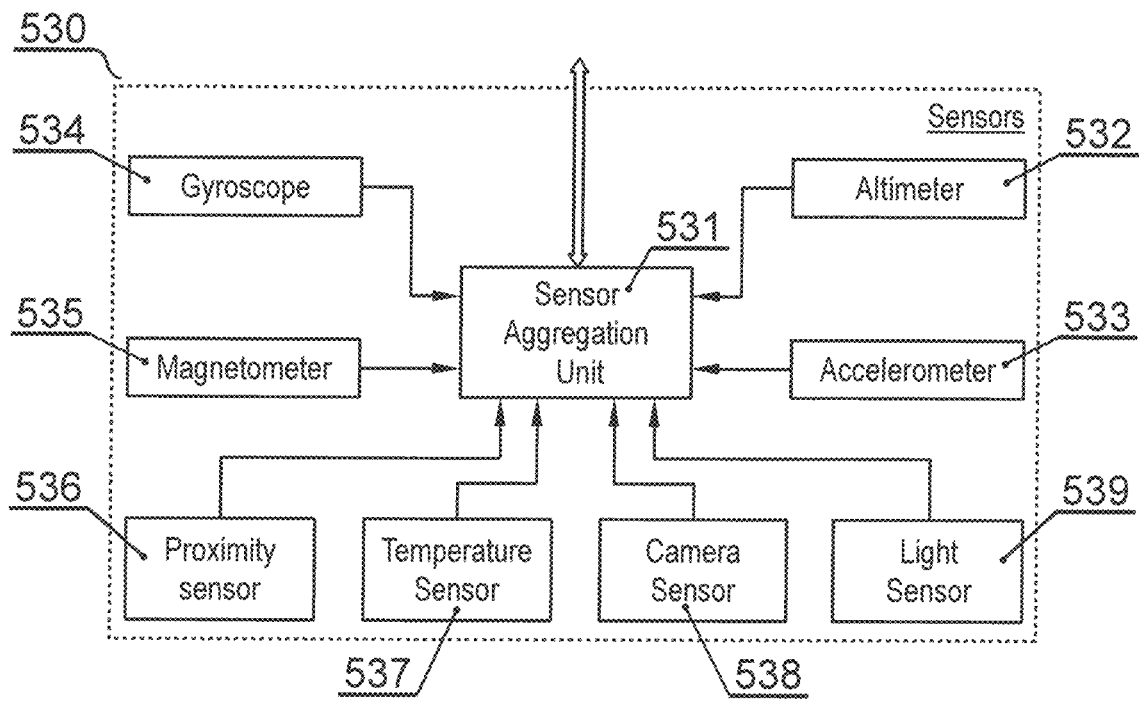
FIG. 5B shows a sensors unit of the mobile device.

FIG. 5B presents a sensors unit 530 of the mobile device. The management of sensors may be controlled by a sensors aggregation unit 531, which serves as a bridge between each of the set of sensors and a client requesting data from respective sensors. The sensors may be any one of or any subgroup of the following sensors: a proximity sensor 536, a temperature sensor 537, a light intensity sensor 539, an accelerometer 533, an altimeter 532, a gyroscope 534, a magnetometer 535, and a camera sensor 538. The aforementioned sensors operate according to principles known in the prior art, in particular in the field of smartphones.

Figure 5C:
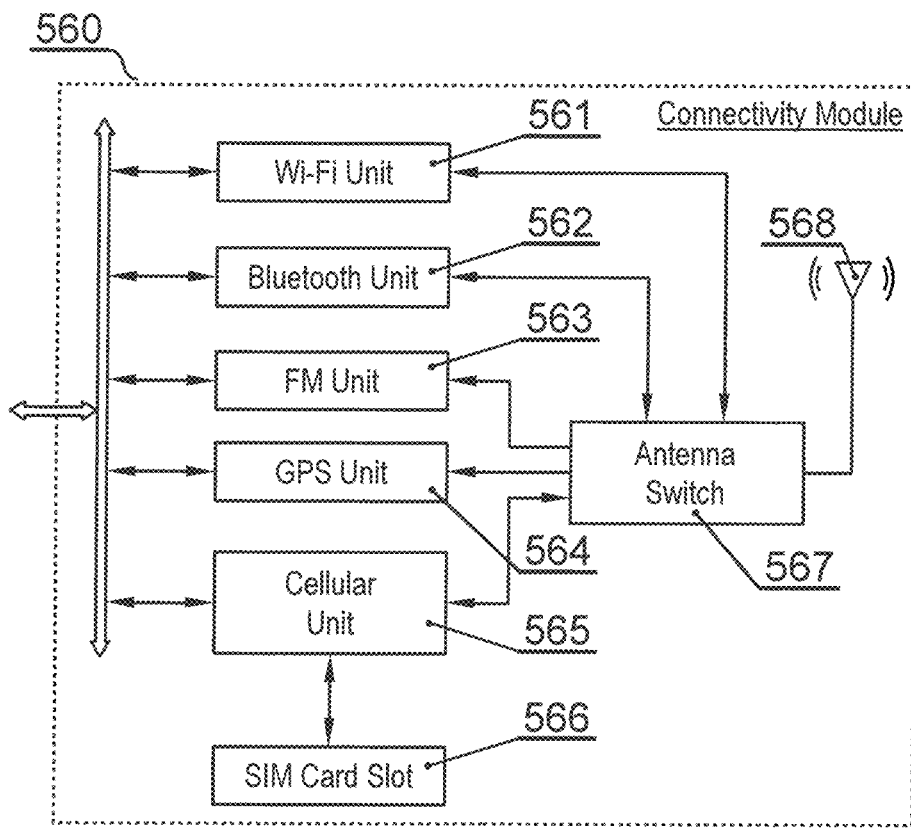
FIG. 5C shows the connectivity module of the mobile device.

FIG. 5C presents the connectivity module 560 of the mobile device. The communication means may be any one of or any subgroup of the following: Wi-Fi 561, Bluetooth 562, FM radio 563, GPS 564, cellular telephony communication unit 565 (such as GSM, 3G, 4G and similar) communicating with a sim card slot 566, or similar. The different communication means may be managed by an antenna switch 567 connected to an antenna module 568 that may comprise one or more types of antennas.

Figure 6A:
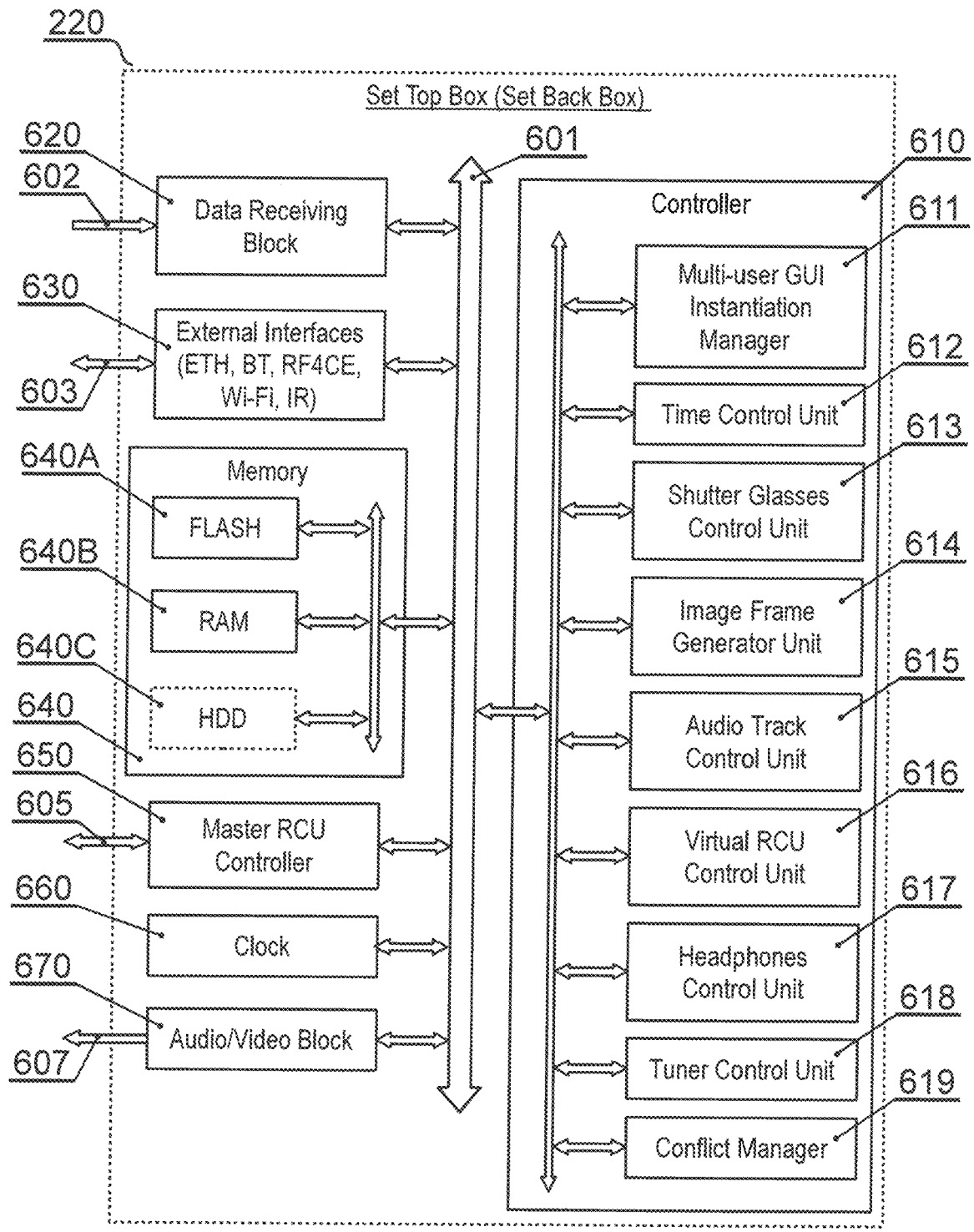
FIG. 6A shows configuration of a decoder.

FIG. 6A shows a structure of the decoder 220. The decoder 220 (a Set Top Box (STB) or a Set Back Box (SBB)) is capable of executing multiple instantiations of the GUI.

A data receiving/transmitting block 620 is configured to communicate, via at least one transmission channel 602, with the Ethernet (IP) network 210 or the wireless network, in order to receive content, applications and/or content data. The decoder may further comprise external interfaces 630 (Ethernet, Bluetooth, Zigbee RF4CE, Wi-Fi, InfraRed) to communicate, via at least one communication channel 603, with other devices or accessories.

A clock module 660 is configured to provide timing data necessary e.g. to synchronize the modules in the decoder.

A master RCU controller 650 is used for communicating 605 with user's remote control units (a standard RCU or the RCU emulated on the mobile device).

An audio/video block 670 is used for decoding the video streams and sending the decoded frames of the multiple video streams to the display device for displaying the streams to the watcher, wherein the frames of the video streams are time-interleaved for sequential display of frames of consecutive streams.

Figure 8:
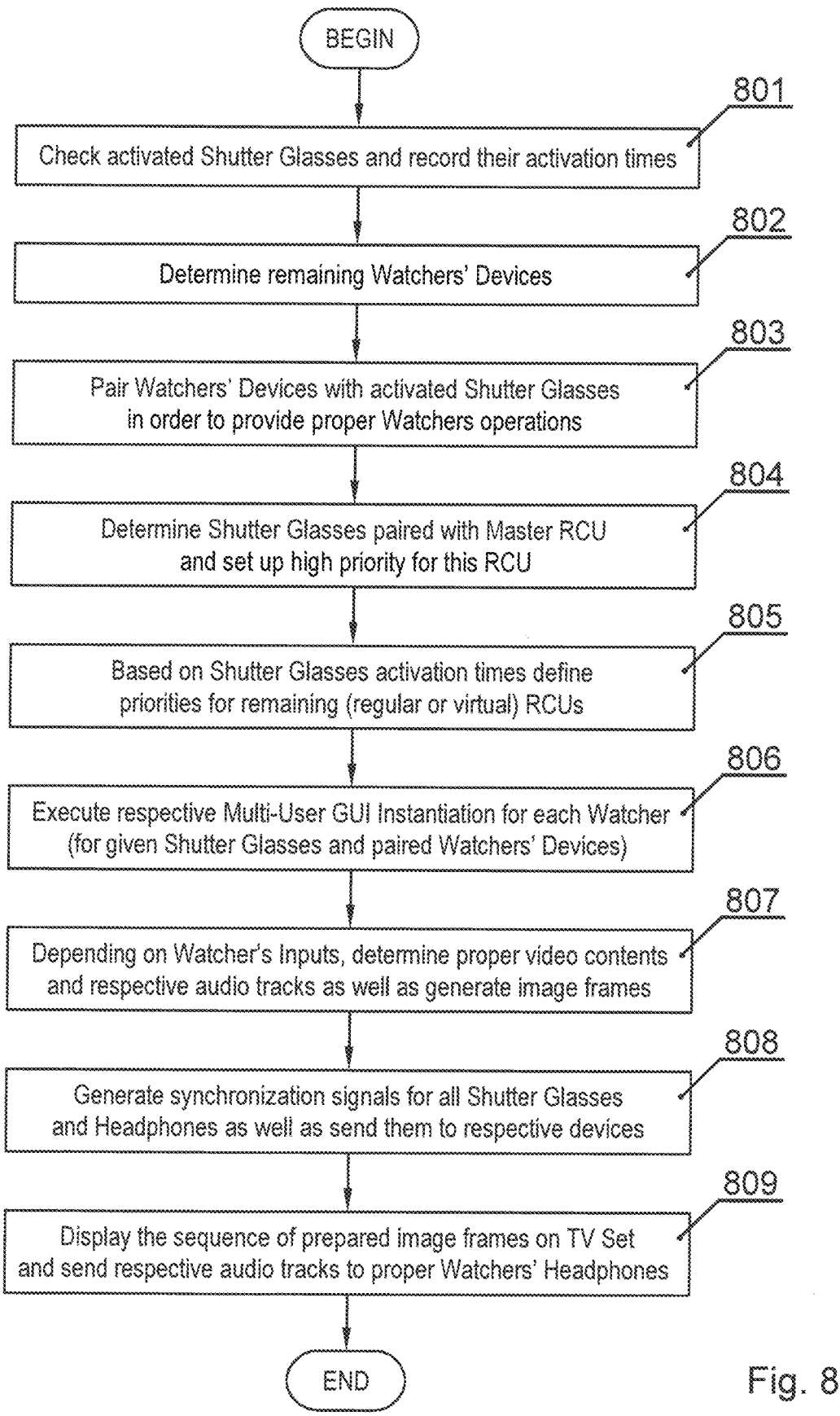
FIG. 8 shows a flowchart of a method for initializing multiple instantiations of a multi-user GUI.

A controller 610 comprises a plurality of units configured to provide the functionality of the system as described herein, including at least one of:
- a multi-user GUI instantiation manager 611 responsible for operating the plurality of instantiations of the aforementioned multi-user GUI for each watcher device and for controlling the remaining processes (612-619) according to a method shown in FIG. 8;
- a time control unit 612 responsible for generating synchronization signals for synchronization with shutter glasses and headphones (or with mobile devices to which the headphones are connected);
- a shutter glasses control unit 613 responsible for monitoring, controlling and communicating with the watcher's shutter glasses to transmit information comprising timing of frames of a particular video stream associated with that shutter glasses;
- an image frame generator 614 responsible for generating image frames corresponding to given instantiation of the multi-user GUI in a frame sequence for the video displayed on the Display device;
- an audio track control unit 615 for isolating audio tracks, from the received audio/video stream, appropriate for the given instantiation of the multi-user GUI and sending them to the corresponding watcher's headphones according to the synchronization signals;
- a virtual RCU control unit 616 responsible for communication and controlling of the virtual remote control units;
- a headphones control unit 617 responsible for communication and controlling of the headphones;
- a tuner control unit 618 for monitoring actual utilization of tuners available in the data receiving block 620 in the decoder (FIG. 6B);
- a conflict manager 619 responsible for detecting potential conflicts resulting from utilizing the resources of tuners and from all possible instantiations of the multi-user GUI operating at the same time.

It is possible that the maximum amount of possible instantiations of the multi-user GUI (being in fact the maximum amount of possible watchers) is smaller than the amount of activated, actually detected by the decoder, shutter glasses. In such situation the conflict manager 619, according to the priorities set for individual RCUs with respect to their activation order, may offer to the watcher using the glasses whose number exceed the number of maximum possible instantiations to watch the contents chosen by the other watcher utilizing glasses with higher priority rank.

The controller 610 operates utilizing memory blocks 640, including RAM 640A and Flash 640B blocks, and optionally a HDD 640C.

Figure 11:
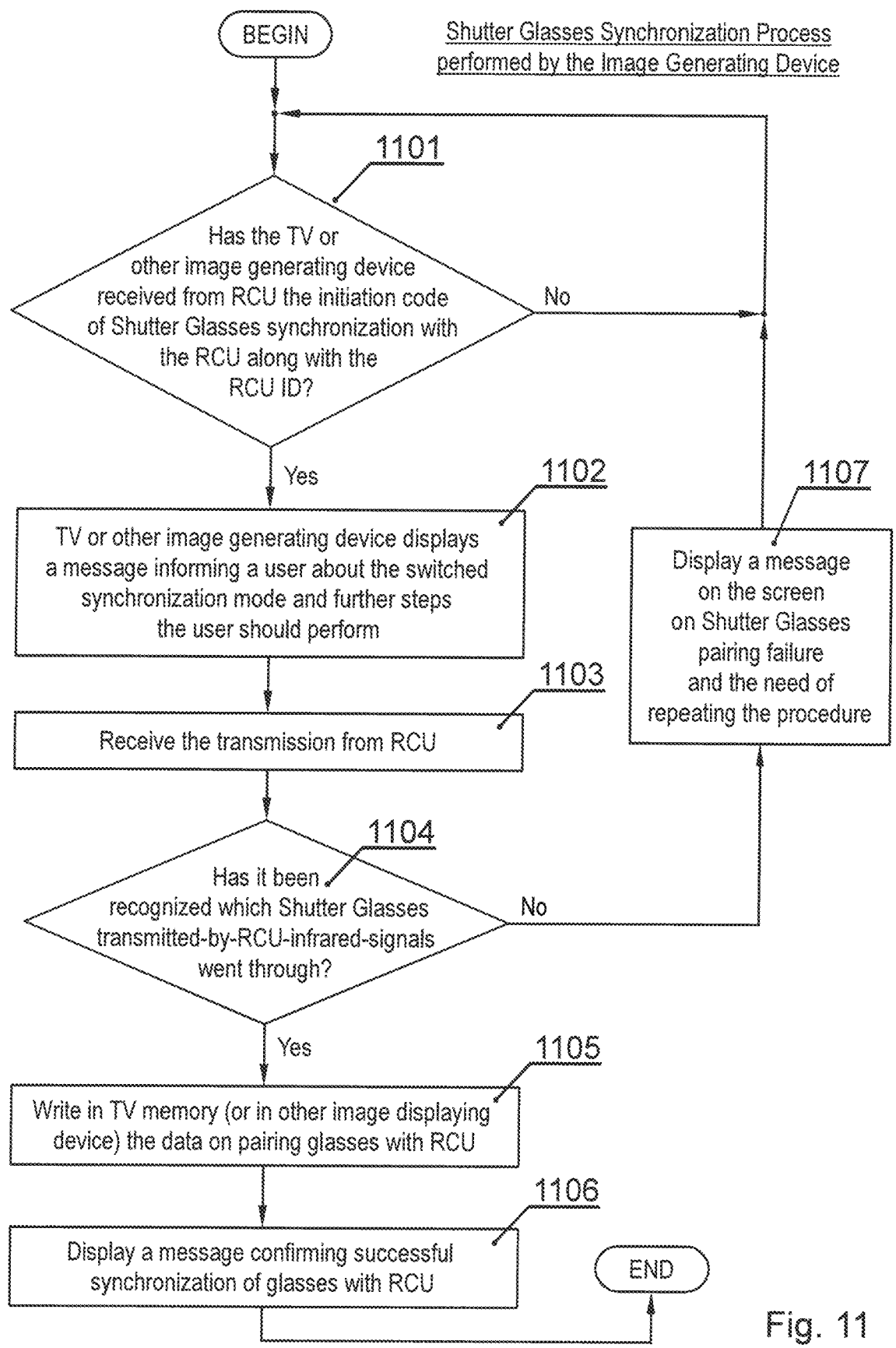
FIG. 11 shows a synchronization procedure conducted by the display device.

The controller 610 is configured to pair shutter glasses with a remote control unit (RCU), i.a. by using the modules 616, 650, in accordance with the procedure described in details with reference to FIG. 11.

The modules of the decoder 220 communicate with each other over a bidirectional data bus 601.

Figure 6B:
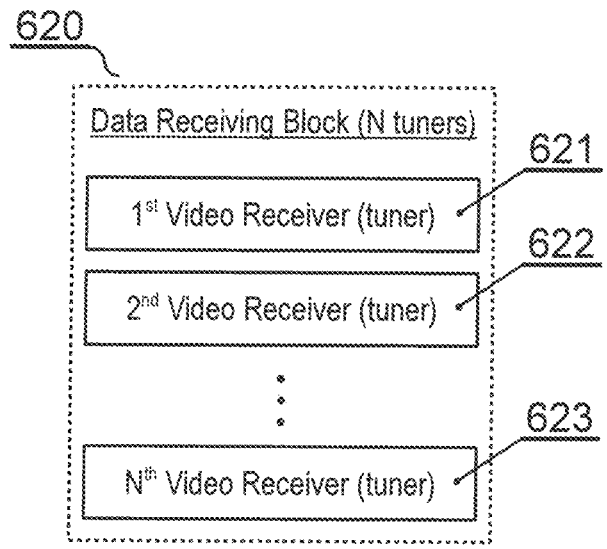
FIG. 6B shows resources of a data receiving block in the decoder.

FIG. 6B shows resources of a data receiving block 620 of the decoder 220. The data receiving block 620 may comprise several front-ends (for example, 2, 4, 8 or 16 front-ends) that allow to receive video streams from several video receivers (tuners) 621-623.

Figure 6C:
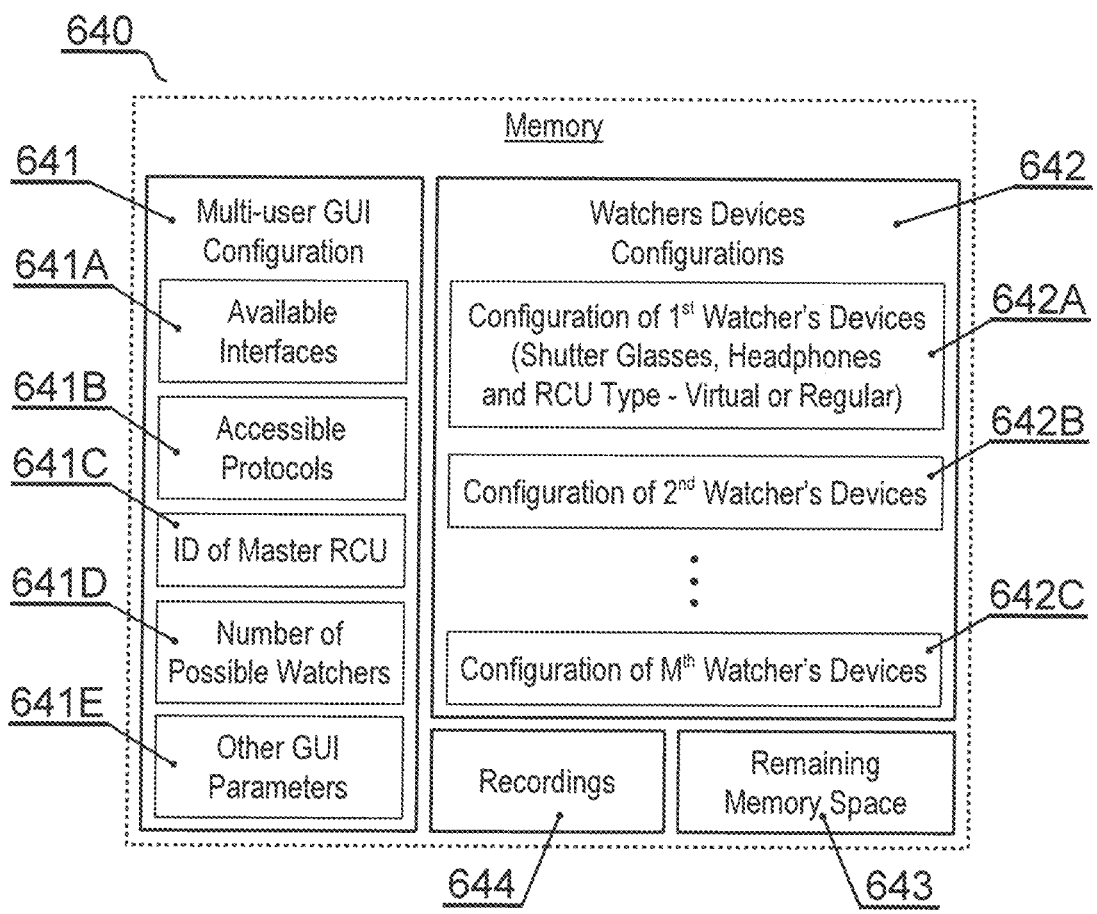
FIG. 6C shows data stored in a memory of the decoder.

FIG. 6C shows data stored in the memory 640 of the decoder. Data is stored in containers, such as tables or other data types.

A multi-user GUI configuration 641 data set comprises information concerning available interfaces 641A, accessible protocols 641B, ID of Master RCU 641C, a number of possible watchers 641D and other GUI parameters 641E.

A watchers' devices configurations 642 data set comprises information concerning configuration of the first watcher's devices 642A, such as shutter glasses, headphones and RCU type (virtual or regular), as well as configuration of the second and consecutive watcher's devices 642B, 642C. The configuration 642A-642C in particular comprises information on an identifier of the RCU which is paired with the particular shutter glasses.

A recordings 644 data set comprises information on recordings stored the mass storage, such as the HDD.

The remaining memory space 643 can be used for storing other data, depending on system needs.

Figure 7A:
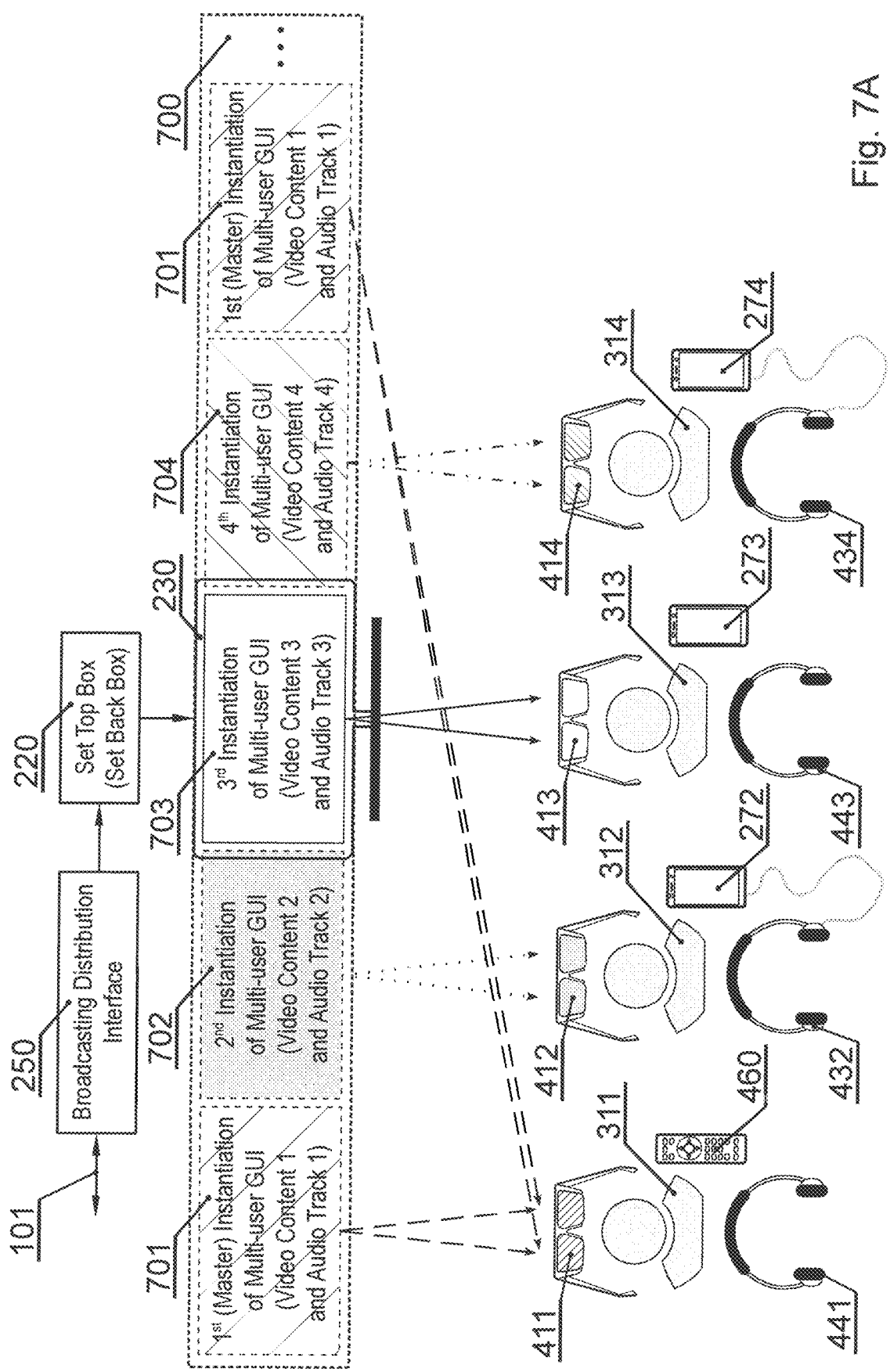
FIG. 7A shows an example of a configuration of a multi-user GUI.

FIG. 7A shows an example of a configuration of a multi-user GUI and the sequences of the displayed images frames. In the presented example, the multi-user GUI has four instantiations 701-704 which are dedicated to four watchers 311-314. Each watcher possesses dedicated shutter glasses, wherein the first watcher 311 additionally uses a standard RCU 460 and wireless headphones 441, the second watcher uses a mobile device 272 with headphones 432 connected to it, the third watcher uses a mobile device 273 and wireless headphones 443 and the fourth watcher uses a mobile device 274 with headphones 434 connected to it. The first instantiation 701 presents video stream 1 and audio track 1 dedicated to the first watcher 411. The first frame of the displaying sequence corresponds to the first instantiation 701. While the first frame is displayed, the lenses of the shutter glasses 411 of the first watcher are transparent (in other words: active, enabled) while the lenses of the glasses of the remaining watchers are opaque (in other words: inactive, disabled). Next, the second frame is displayed which corresponds to the second instantiation 702 (presenting video stream 2 and audio track 2) dedicated to the second watcher 312. When the second frame is displayed the lenses of the second watcher's glasses 412 are transparent while lenses of the glasses of the remaining watchers are opaque. Equivalent principles apply to the third and fourth instantiation.

Figure 7B:
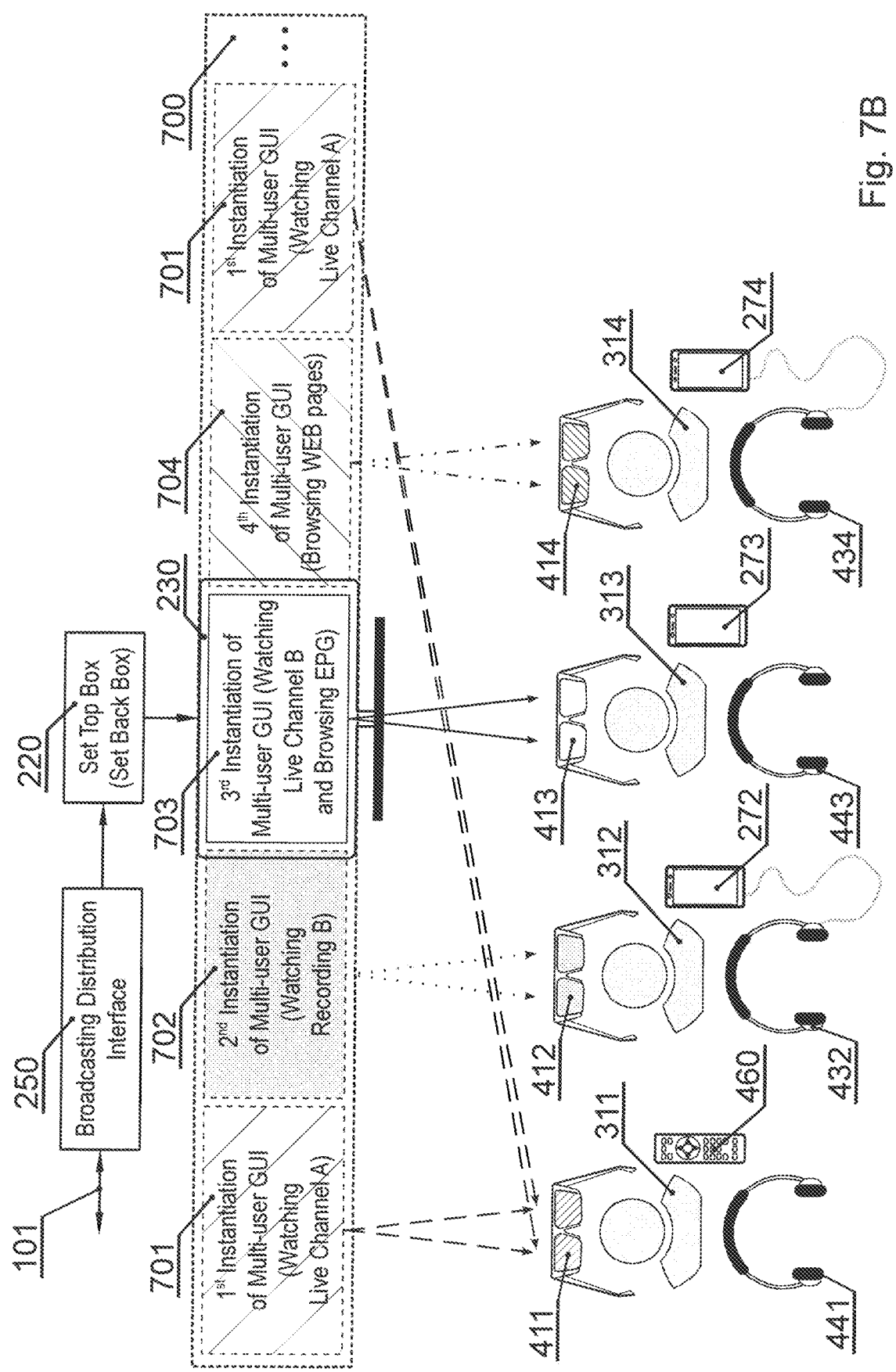
FIG. 7B shows the multi-user GUI configuration of FIG. 7A with different types of displayed content.

FIG. 7B shows the multi-user GUI configuration of FIG. 7A with different types of displayed content, wherein;
the first watcher 311, using the first instantiation 701, watches a live television channel A;
the second watcher 312, using the second instantiation 702, watches a recorded Recording B;
the third watcher 313, using the third instantiation 703, browses an EPG while watching television channel B;
the fourth watcher 314, using the fourth instantiation 704, browses WEB pages.

Therefore each instantiation 701-704 may be related to the different content dedicated for each watcher 311-314.

Figure 7C:
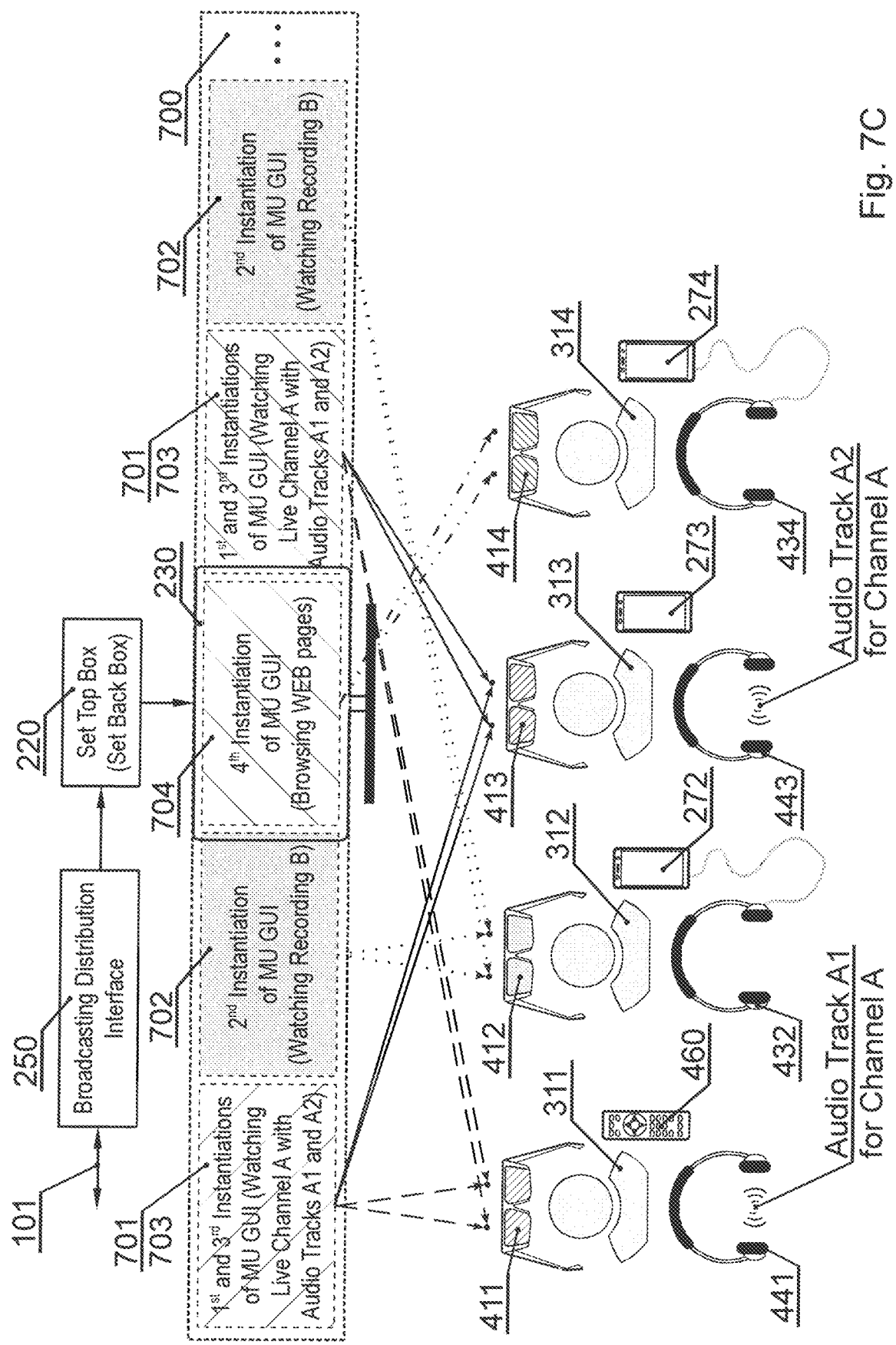
FIG. 7C shows another configuration of the multi-user GUI.

FIG. 7C shows another configuration of the multi-user GUI, with four instantiations, wherein the watchers 311 and 313 are watching the same video streams (common for the first instantiation 701 and the third instantiation 703) but with different audio tracks A1 and A2. The other watchers 312 and 314 watch other instantiations 702, 704 having different video and audio contents. Reducing the amount of differing video streams (reduction of video frames) from four down to three allows to run another instantiation of the multi-user GUI having different video and audio content. It also reduces the utilization of the system resources.

FIG. 8 shows a flowchart of the consecutive steps of a method for initialization of multiple instantiations of a multi-user GUI on the decoder. In the first step 801, the system checks the activated shutter glasses and records their activation times which later define their priority values. Next in step 802, the remaining watchers' devices are determined. In step 803, the watchers' devices are paired with the activated shutter glasses in order to provide corresponding watchers' operations. In step 804 the shutter glasses paired with a master RCU are determined and a high priority is set up for this RCU. In step 805, on the basis of the shutter glasses activation times, the priorities for the remaining (regular or virtual) RCUs are defined. In step 806, the respective multi-user GUI instantiations for each watcher (for given shutter glasses and paired watchers' devices) are executed. In step 807, depending on the watcher's inputs, corresponding video streams and audio tracks are determined, and image frames are generated, including an overlay of a GUI instantiation associated with the particular set of watcher devices. In step 808, synchronization signals for all shutter glasses and headphones are generated and sent to the respective devices. In step 809, the prepared sequence of the image frames are displayed on the display device and the respective audio tracks are sent to corresponding watchers' headphones.

Figure 9A:
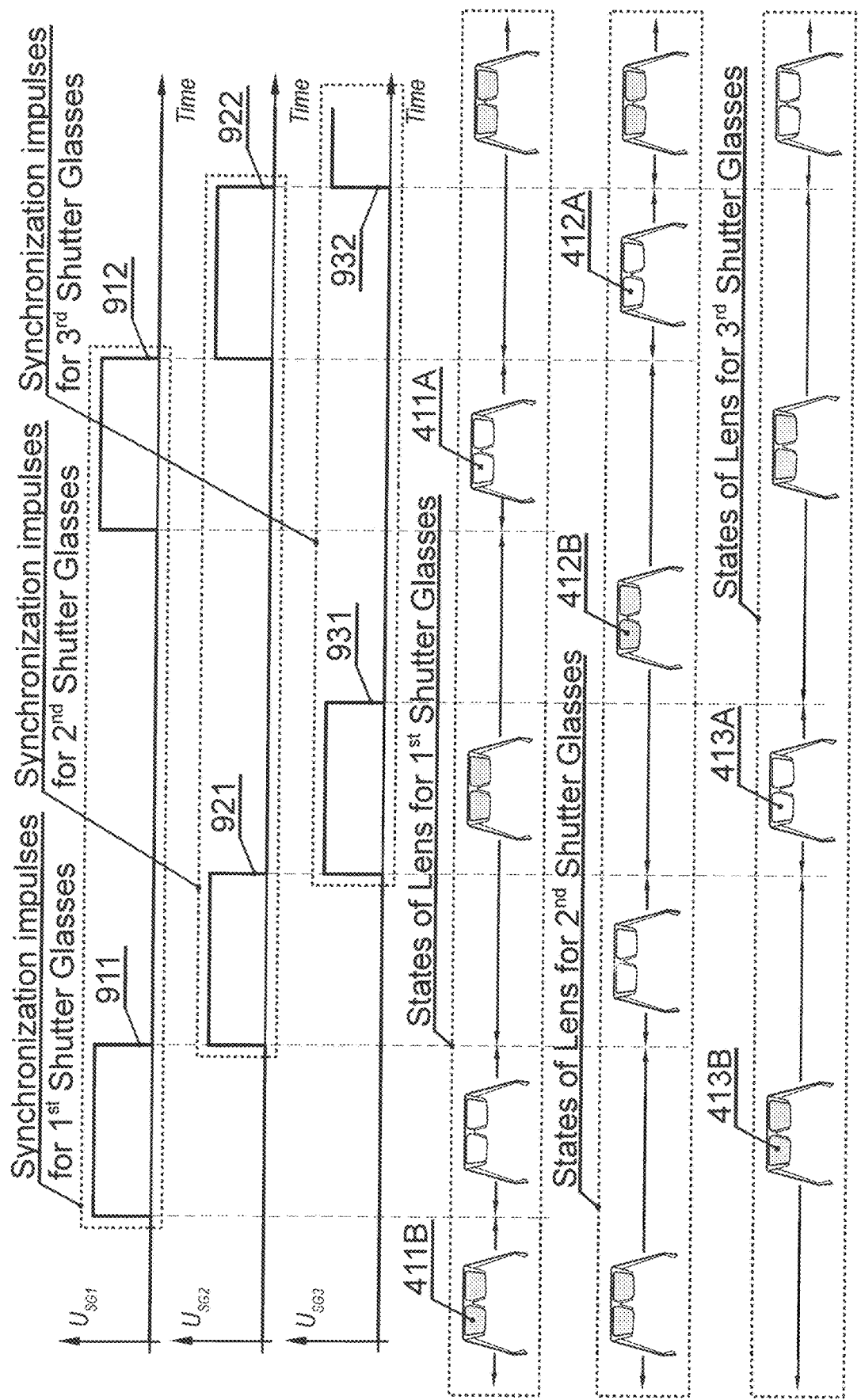
FIGS. 9A-9B show details of synchronization of the shutter glasses and the RCUs.
Figure 9B:
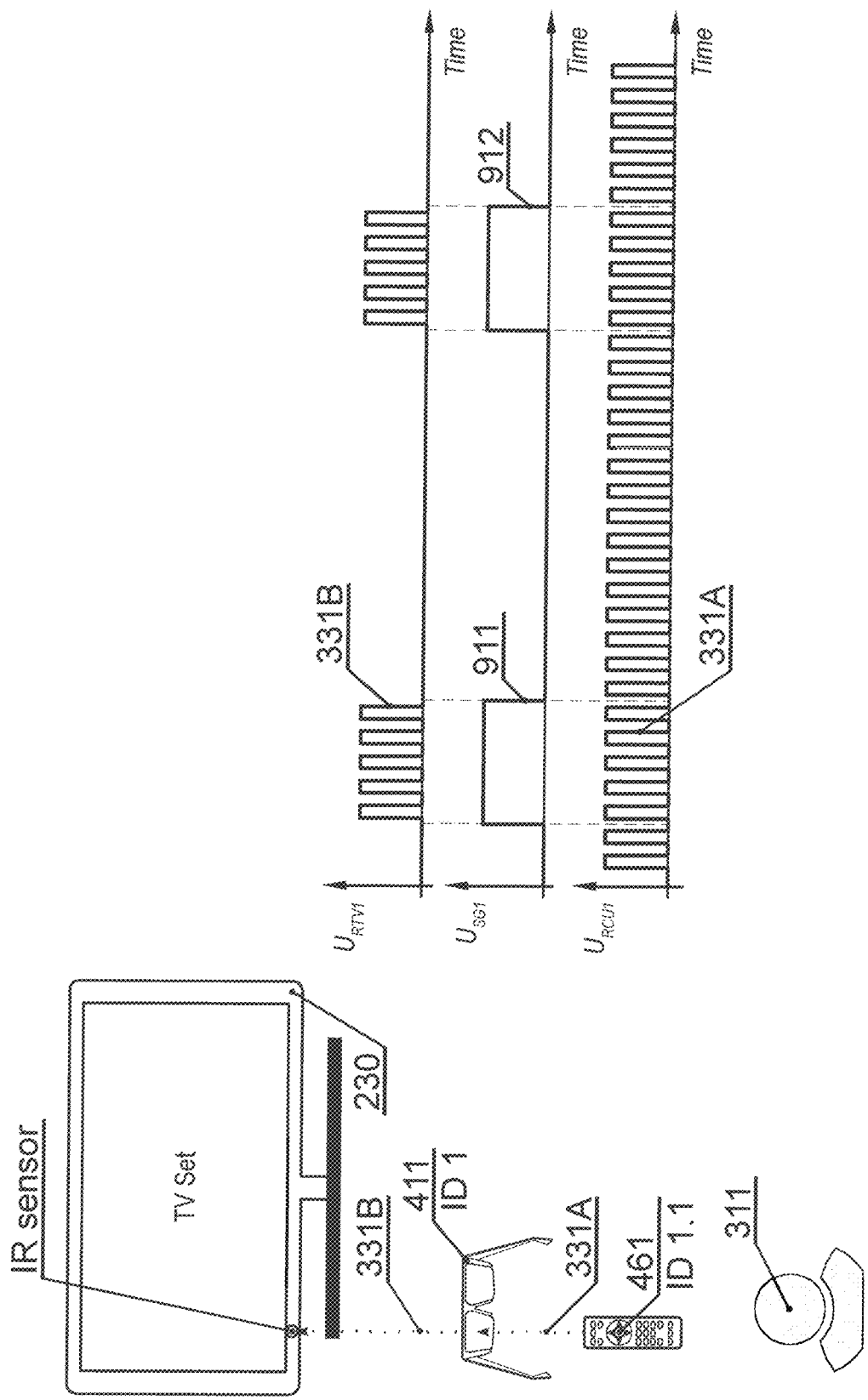

FIGS. 9A-9B show details of the pairing of the shutter glasses and RCUs. The TV set or another generating device sends synchronization impulses 911, 921, 931 for each shutter glasses. The impulses are generated sequentially—after the first cycle has ended the second identical cycle of impulses 912, 922, 932 is sent. The number of the impulses in each cycle depends on the number of glasses which are registered in the system. The impulses contain information that impulses 911, 912 are dedicated to the first shutter glasses 411 and impulses 921, 922 are dedicated to the second shutter glasses 412, similarly the impulses 931, 932 are dedicated to the third shutter glasses 413. Therefore, during the time of impulses 911, 912 the lenses of the first glasses 411 are transparent 411A, and at other times (when there are no impulses 911, 912) the shutter glasses 411 are opaque 411B. Similarly for the impulses 921, 922 the lenses of the second glasses 412 are transparent 412A while in between the impulses 921, 922 that are opaque 412B. Synchronically with the impulses 911, 921, 931 the video frames are displayed dedicated to be viewed respectively by the shutter glasses 411, 412, 413. Therefore, each watcher wearing the shutter glasses receives the frames of the video stream selected by the watcher's.

As depicted in FIG. 9B, during synchronization of the RCU 461 with the shutter glasses 411, the RCU sends a sequence of infrared light wave impulses 331A as long as a synchronization button is pressed by the user. When the sequence 331A passes through the lens of the glasses 411, it is converted into packets of impulses 331B due to the changing state (transparent/opaque) of the shutter glasses lenses 411 according to their synchronization signals 911, 912 sent by the display device 230. On the basis of the position of packets 331B of impulses in time when the display device 230 received the packet 331B and the corresponding synchronization impulse 911, the ID of the RCU 461 which sent the impulse sequence 331A through the glasses 411 (the glasses 411 changed the sequence 331A into the packet 331B), may be assigned. The exact procedure is conducted with reference to the remaining RCUs (462, 464) and glasses (412, 414).

Figure 10:
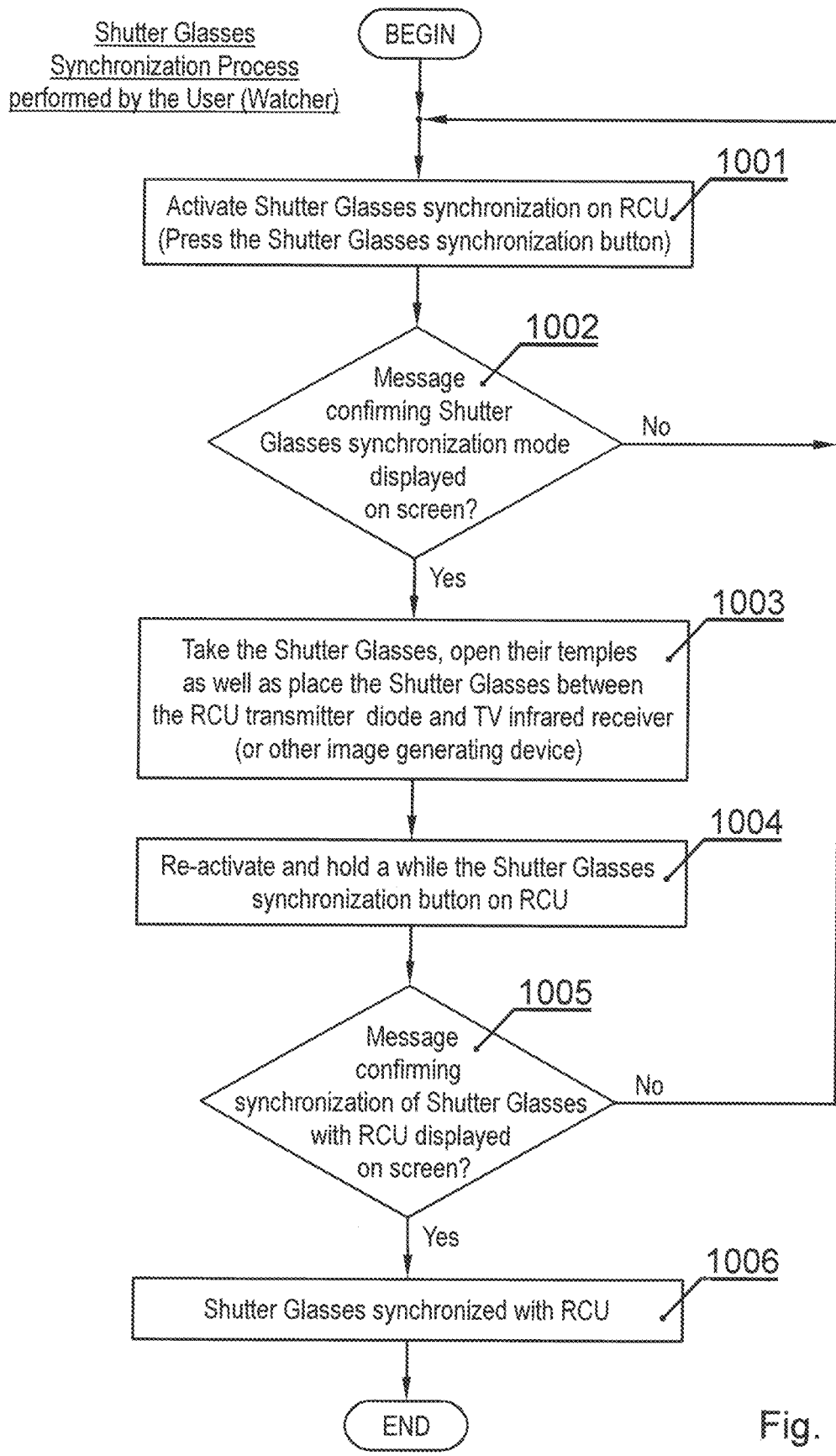
FIG. 10 shows a synchronization procedure conducted by the watcher.

FIG. 10 shows a synchronization procedure as conducted by the watcher. In the first step 1001 the watcher presses the synchronization button (or another button) on the RCU. After receiving the synchronization command, the display device displays in step 1002 information concerning the start of the synchronization (otherwise, the synchronization button should be activated again). The information is displayed on all video frames of a sequence (video frames belonging to each video stream) so that the user without the shutter glasses on (in this stage of the synchronization procedure the watcher is not wearing the shutter glasses) is able to read the message. In the next step 1003 the watcher opens the temples of the shutter glasses and places the lens of the glasses between the RCU transmitter diode and the TV set (or another image generating device) infrared receiver. In step 1004, the watcher reactivates and holds the synchronization button on the RCU for a short period of time. After receiving the infrared signal, the display device, basing on the position of packets of impulses in time is able to associate the given RCU (basing on its ID emitted during sending any command) with the shutter glasses which are transparent only during a given period of time. In step 1005, a message confirming a successful synchronization of the shutter glasses with the RCU should be displayed on the screen. The message is displayed on all frames of the sequence. If the message is displayed, the shutter glasses are synchronized with the RCU 1006, otherwise the procedure should be conducted again beginning in step 1001.

For example, the RCU may be configured, once a synchronization button is pressed, to transmit an initiation code and the RCU identification code (ID) followed by a series of impulses, wherein the series of impulses is continued until the user holds the synchronization button. Alternatively, when the user presses the synchronization button for the first time (e.g. for the first time since a predetermined time has elapsed since the button was pressed the last time. e.g. 10 seconds), only the initiation code and the identification code may be transmitted and when the user presses the synchronization button for the second time, the series of impulses is transmitted until the user holds the synchronization button.

FIG. 11 shows a synchronization procedure as conducted by the display device (for example 220, 230). In the first step 1101, the display device checks if the initiation code and/or the RCU ID is received from the RCU (as initiated by the user by pressing the synchronization button). If the signal is received, in step 1102 the device stores the received RCU ID and displays the message informing about the start of the synchronization procedure and the following steps to be performed by the user, otherwise the procedure returns to step 1101. In step 1103 the display device awaits for subsequent transmission of an IR signal 331B from the RCU. In step 1104 after receiving the IR signal from the RCU the display device checks if it recognized which shutter glasses transmitted by the RCU infrared signals. If the recognition is not successful, a message is displayed 1107 on the screen informing about the pairing failure and the need to repeat the procedure. The signal is recognized by comparing the temporal correspondence of the IR signal with the particular synchronization signal. For example, the IR signal can be found to be corresponding with a particular synchronization signal when the IR signal was at least partially active during the active time of the synchronization signal (i.e. when the synchronization signal indicated the lens to be open) and when the IR signal was not active during the inactive time of the synchronization signal (i.e. when the synchronization signal indicated the lens to be shut). After correct shutter glasses and RCU recognition (i.e. determining a correspondence of the IR signal with one of the synchronization signals), in step 1105 the display device stores in the memory 642 the pairing data 642A-642C of the shutter glasses ID (for which the recognized synchronization signal was generated) with the RCU ID. In step 1106 the information about the successful synchronization of the shutter glasses with the RCU is displayed.

It can be easily recognized, by one skilled in the art, that the aforementioned method for pairing of shutter glasses with a remote control unit may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A non-transitory computer readable storage medium comprising instructions that cause a processor to pair shutter glasses with a remote control unit (RCU) for use with a display device configured to display a plurality of video streams by time interleaving the frames of the video streams and sending synchronization signal to the shutter glasses, by performing the following steps when such instructions are executed by the processor, the steps comprising:
generating at least one synchronization signal for the shutter glasses;
transmitting, by the RCU, an infrared (IR) signal for receipt by the display device, such that the IR signal passes through at least one lens of the shutter glasses prior to receipt of the IR signal by the display device, wherein the shutter glasses are separate from the RCU and operate, by alternating the at least one lens of the shutter glasses between a transparent state and an opaque state, according to the generated at least one synchronization signal;
receiving, by the display device, the IR signal from the RCU after the IR signal passes through the at least one lens of the shutter glasses;
comparing the temporal correspondence of the received IR signal with the generated at least one synchronization signal; and
in case a temporal correspondence is found, pairing the RCU with the shutter glasses for which the correspondent synchronization signal was found, wherein the shutter glasses for which the correspondent synchronization signal was found is a first shutter glasses of a plurality of shutter glasses, and wherein the RCU that is paired with the first shutter glasses is a first RCU of a plurality of RCUs, and wherein the correspondent synchronization signal is a first synchronization signal of the generated at least one synchronization signal, and wherein the steps further comprise:
transmitting, by a second RCU of the plurality of RCUs, a second IR signal for receipt by the display device, such that the IR signal passes through at least one lens of a second shutter glasses of the plurality of shutter glasses prior to receipt of the second IR signal by the display device, wherein the second shutter glasses operate, by alternating the at least one lens of the second shutter glasses between a transparent state and an opaque state, according to a second synchronization signal of the generated at least one synchronization signal;
receiving, by the display device, the second IR signal from the second RCU after the second IR signal passes having passed through the at least one lens of the second shutter glasses;
comparing the temporal correspondence of the received second IR signal with the generated at least one synchronization signal; and
pairing the second RCU with the second shutter glasses in response to temporal correspondence between the received second IR signal and the second synchronization signal.

2. A method for causing a processor to pair shutter glasses with a remote control unit (RCU) for use with a display device configured to display a plurality of video streams by time interleaving the frames of the video streams and sending synchronization signal to the shutter glasses, by performing the following steps, the steps comprising:
generating at least one synchronization signal for the shutter glasses;
transmitting, by the RCU, an infrared (IR) signal for receipt by the display device, such that the IR signal passes through at least one lens of the shutter glasses prior to receipt of the IR signal by the display device, wherein the shutter glasses are separate from the RCU and operate, by alternating the at least one lens of the shutter glasses between a transparent state and an opaque state, according to the generated at least one synchronization signal;

receiving, by the display device, the IR signal from the RCU after the IR signal passes through the at least one lens of the shutter glasses;

comparing the temporal correspondence of the received IR signal with the generated at least one synchronization signal; and in case a temporal correspondence is found, pairing the RCU with the shutter glasses for which the correspondent synchronization signal was found, wherein the shutter glasses for which the correspondent synchronization signal was found is a first shutter glasses of a plurality of shutter glasses, and wherein the RCU that is paired with the first shutter glasses is a first RCU of a plurality of RCUs, and wherein the correspondent synchronization signal is a first synchronization signal of the generated at least one synchronization signal, and wherein the steps further comprise:

transmitting, by a second RCU of the plurality of RCUs, a second IR signal for receipt by the display device, such that the IR signal passes through at least one lens of a second shutter glasses of the plurality of shutter glasses prior to receipt of the second IR signal by the display device, wherein the second shutter glasses operate, by alternating the at least one lens of the second shutter glasses between a transparent state and an opaque state, according to a second synchronization signal of the generated at least one synchronization signal;

receiving, by the display device, the second IR signal from the second RCU after the second IR signal passes through the at least one lens of the second shutter glasses;

comparing the temporal correspondence of the received second IR signal with the generated at least one synchronization signal; and pairing the second RCU with the second shutter glasses in response to temporal correspondence between the received second IR signal and the second synchronization signal.

3. A non-transitory computer readable storage medium comprising instructions that cause a processor to pair shutter glasses with a remote control unit (RCU) for use with a display device configured to display a plurality of video streams by time interleaving the frames of the video streams and sending synchronization signal to the shutter glasses, by performing the following steps when such instructions are executed by the processor, the steps comprising:

generating at least one synchronization signal for the shutter glasses;

receiving, by the display device, an infrared (IR) signal transmitted by the RCU, the IR signal having been transmitted by the RCU such that the IR signal passes through at least one lens of the shutter glasses prior to the IR signal being received by the display device, wherein the shutter glasses are separate from the RCU and operate, by alternating the at least one lens of the shutter glasses between a transparent state and an opaque state, according to the generated at least one synchronization signal;

comparing the temporal correspondence of the received IR signal with the generated at least one synchronization signal; and in case a temporal correspondence is found, pairing the RCU with the shutter glasses for which the correspondent synchronization signal was found, wherein the shutter glasses for which the correspondent synchronization signal was found is a first shutter glasses of a plurality of shutter glasses, and wherein the RCU that is paired with the first shutter glasses is a first RCU of a plurality of RCUs, and wherein the correspondent synchronization signal is a first synchronization signal of the generated at least one synchronization signal, and wherein the steps further comprise:

receiving, by the display device, a second IR signal transmitted by the second RCU, the second IR signal having been transmitted by the second RCU such that the second IR signal passes through at least one lens of the second shutter glasses prior to the second IR signal being received by the display device, wherein the second shutter glasses operate, by alternating the at least one lens of the second shutter glasses between a transparent state and an opaque state, according to a second synchronization signal of the generated at least one synchronization signal;

comparing the temporal correspondence of the received second IR signal with the generated at least one synchronization signal; and pairing the second RCU with the second shutter glasses in response to temporal correspondence between the received second IR signal and the second synchronization signal.

* * * * *